(12) United States Patent
Wang et al.

(10) Patent No.: US 6,994,308 B1
(45) Date of Patent: Feb. 7, 2006

(54) IN-TUBE SOLENOID GAS VALVE

(76) Inventors: Wei-Ching Wang, 1791 Branchwood Park, Mississauga, Ontario (CA) L4W 2E5; Chia-Ping Wang, 1791 Branchwood Park, Mississauga, Ontario (CA) L4W 2E5

( * ) Notice: Subject to any disclaimer, the term of this patent is extended or adjusted under 35 U.S.C. 154(b) by 0 days.

(21) Appl. No.: 10/924,789

(22) Filed: Aug. 25, 2004

(51) Int. Cl.
*F16K 31/02* (2006.01)

(52) U.S. Cl. .............................. 251/30.04; 251/129.21
(58) Field of Classification Search ............ 251/30.03, 251/30.04, 129.21
See application file for complete search history.

(56) References Cited

U.S. PATENT DOCUMENTS

| | | | | |
|---|---|---|---|---|
| 3,312,445 A | * | 4/1967 | Trombatore et al. ..... | 251/30.03 |
| 4,520,227 A | * | 5/1985 | Krimmer et al. ...... | 251/129.21 |
| 5,188,017 A | * | 2/1993 | Grant et al. ............. | 251/30.04 |
| 5,529,387 A | * | 6/1996 | Mialkowski ............. | 251/30.03 |

* cited by examiner

*Primary Examiner*—John Bastianelli
(74) *Attorney, Agent, or Firm*—Peter R. Hammond; Ridout & Maybee LLP

(57) ABSTRACT

A solenoid gas valve having a solenoid assembly and inlet and outlet fittings is installed inside a tube. The opening and closing of the valve is operated by the pressure difference with an aid of the magnetic field. A compression spring is attached to the support cylindrical body and held against the inlet end fitting while a moving solenoid assembly is located inside the support cylindrical body. The moving solenoid assembly that consists of a stop, a flange, a sleeve and an electrical coil, is held by a second compression spring that is attached to the inside of the support cylindrical body. A small moving magnetic rod, slides inside the sleeve of the solenoid assembly. Acted by a third compression spring, the magnetic rod seals the gas outlet through the bleed orifice on the flange of the solenoid assembly.

11 Claims, 5 Drawing Sheets

IN-TUBE SOLENOID GAS VALVE

BACKGROUND OF THE INVENTION

The configuration of piping systems is complex in alternative fuel vehicles. The fuel, either natural gas or hydrogen, is normally stored in a high pressure tank, controlled by solenoid gas valves when it is in operation. Generally, the space in a vehicle is limited; hence a small size of valves and piping systems is desired. In addition, having an in-line inlet and outlet ports would simplify the arrangement of piping systems.

Valves are used to control the flow rate of the fuel under a specified inlet pressure. Because of the inlet pressure restrictions and temperature variations, it is difficult to design an appropriate valve that meets all the requirements for the piping systems. Solenoids of a reasonable size can typically produce a pulling force that is approximately only $1/100$ of the force necessary to unseat a valve that is being forced shut by the high-pressure gases. To overcome this, most of the gas valves adopt a two-stage process in which a small "bleed" orifice is first opened, allowing the high-pressure gas from the storage tank to flow into a downstream outlet passage way through the "bleed" orifice that leads to the engine. As the downstream outlet passage way filled with gas, the pressure will increase, subsequently reducing the force necessary gradually to unseat the closed valve. Eventually, the differential pressure between the upstream and downstream passage ways becomes infinite small to allow the valve to be opened by a relatively weak pull of the solenoid valve, thus resulting in the flow of high-pressure gas from the storage tank to the vehicle engine.

In a typical two-stage valve assembly, two pistons were required in the operation solenoid assembly, namely primary piston and main piston. The primary piston is located on top of the main piston. When in operation, the primary piston is first opened to allow gas flow through a small bleed orifice located on the main piston to create a pressure difference between the front and back sides of the main piston. This difference in pressure causes the valve to open to gain full gas flow. Since the movement of both pistons affects one another, the opening stroke (distance) of the primary piston must be equal to or larger than that of the main piston to give required operations. Since an electrical coil is utilized to generate magnetic field to cause the primary piston to open, the longer the primary piston has to travel, the less magnetic force the piston experiences. This becomes problematic if the pressure of the inlet is increased. Hence, to increase the magnetic attraction force that the primary piston experiences, the magnetic field strength has to be increased. To increase the magnetic strength, the number of turns of the electrical coil has to be increased if the input current stays the same. An increase in number of turns in a coil also increases the size of the solenoid assembly, which is undesirable.

In the current design, described hereafter, the equivalent main piston will move with a solenoid assembly while the movement of equivalent small piston does not affect the movement of the main piston. It can reasonably reduce the size of valve and/or increase the gas flow rate.

SUMMARY OF THE INVENTION

The newly designed solenoid valve can be used in a high gas flow and high pressure application. It is most applicable where a small-sized solenoid gas valve with the ability to control high gas flow rate.

It is the object of the present invention to provide an in-tube solenoid gas valve of the above mentioned general types which avoid the disadvantages of and improve the performance of the prior art.

It is also the object of the present invention to provide a solenoid gas valve which has intrinsic ability to reduce the opening stroke (distance) of a magnetic rod to either alleviate the electrical power required or to reduce the size of the valve. The movement of solenoid assembly is caused by the spring force and gas pressure; therefore, the opening distance of said solenoid assembly is not limited by magnitude of magnetic force generated by electrical power via electrical coil. So that, the present invention can reasonably increase gas flow rate.

In keeping with these objects and with others which will became apparent hereinafter, features of present invention reside, briefly stated in a solenoid gas valve which has a valve tube defining a gas inlet passage with an inlet fitting, a gas outlet passage with a outlet fitting, and a cavity; a support cylindrical body, inserting onto outlet fitting, held by a compression spring against to inlet fitting. A solenoid assembly comprising with flange, electrical coil, stop, and sleeve, movable axially in the chamber of said support cylindrical body, pushed by a compression spring against on the seat of said outlet fitting to close gas flow. An o-ring on said flange of said solenoid assembly segregates the chamber of said support cylindrical body into front side chamber and back side chamber.

There are two gas conduits to the outlet passage. The main gas flows through holes on said support cylindrical body peripherally, locating at the side of attaching to outlet fitting, into the back side chamber in support cylindrical body. Another gas conduit, the gas flow goes through the minuscule hole in said support cylindrical body, then, via the eccentric axial small hole in the said stop to the hollow space of said solenoid assembly.

A magnetic rod, able to slide in said hollow space of said solenoid assembly, is pushed by a compression spring against on the bleed orifice of said flange of said solenoid assembly to close gas flow. A said electrical coil means associated with said stop, said sleeve, said flange, and said support cylindrical body to provide a magnetic field for movements of said magnetic rod, so that when said electrical coil is de-energized, said magnetic cylindrical rod closes said bleed orifice to seal gas flow and causes a pressure equalization, allowing said compression spring to push said solenoid assembly to close the valve. When said electrical coil is energized said magnetic rod opens said bleed orifice to let gas flow to said outlet passage and lowers a pressure which causes a pressure difference between front and back side of said solenoid assembly, pushing of said main piston to open the valve.

The lead wires of said electrical coil extend to the external pass-through connector for powering via the internal chamber in said support cylindrical body, internal pass-through plug, inside said cavity of said valve tube.

Hence, in the current design, described hereafter, the stroke of the movement of magnetic rod is not affected by the required stroke of that of the solenoid assembly. The stroke of the magnetic rod is minimized and the stroke of the solenoid assembly is maximized to result in a reduction of the electrical coil size and an increase in maximum flow rate under the same conditions of the same inlet pressure and the same power supply.

When the solenoid gas valve is designed in accordance with the present invention, it avoids the disadvantages of the prior art and provide for the above-specified advantages.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

One embodiment of this invention is illustrated in the accompanying drawings, in which like numerals denote like parts throughout the several views, and in which.

DESCRIPTION OF PREFERRED EMBODIMENTS

Figure 1:
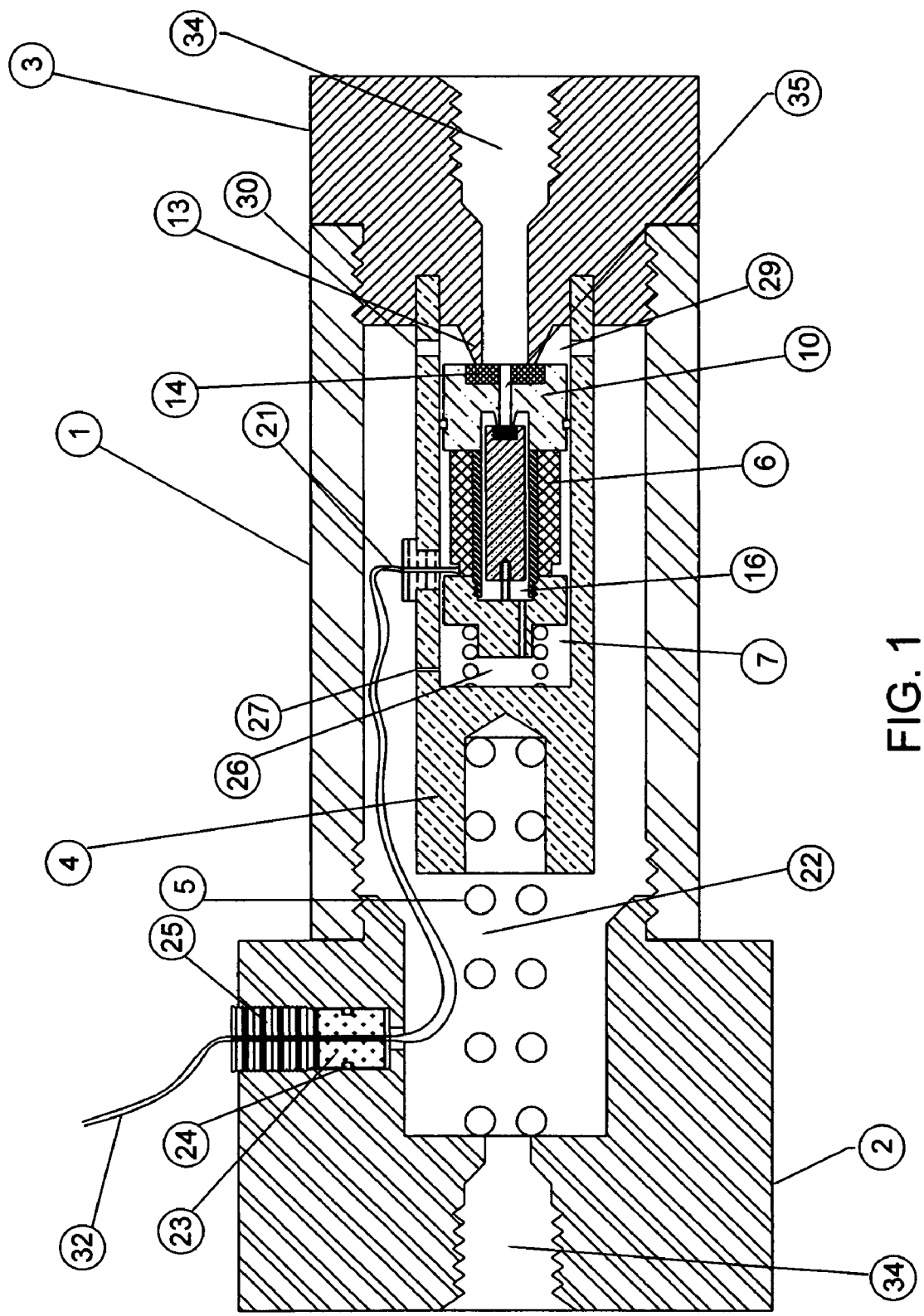
FIG. 1 is an axial sectional view through a valve constructed in accordance with this invention, showing the valve in a "closed" state.
Figure 2:
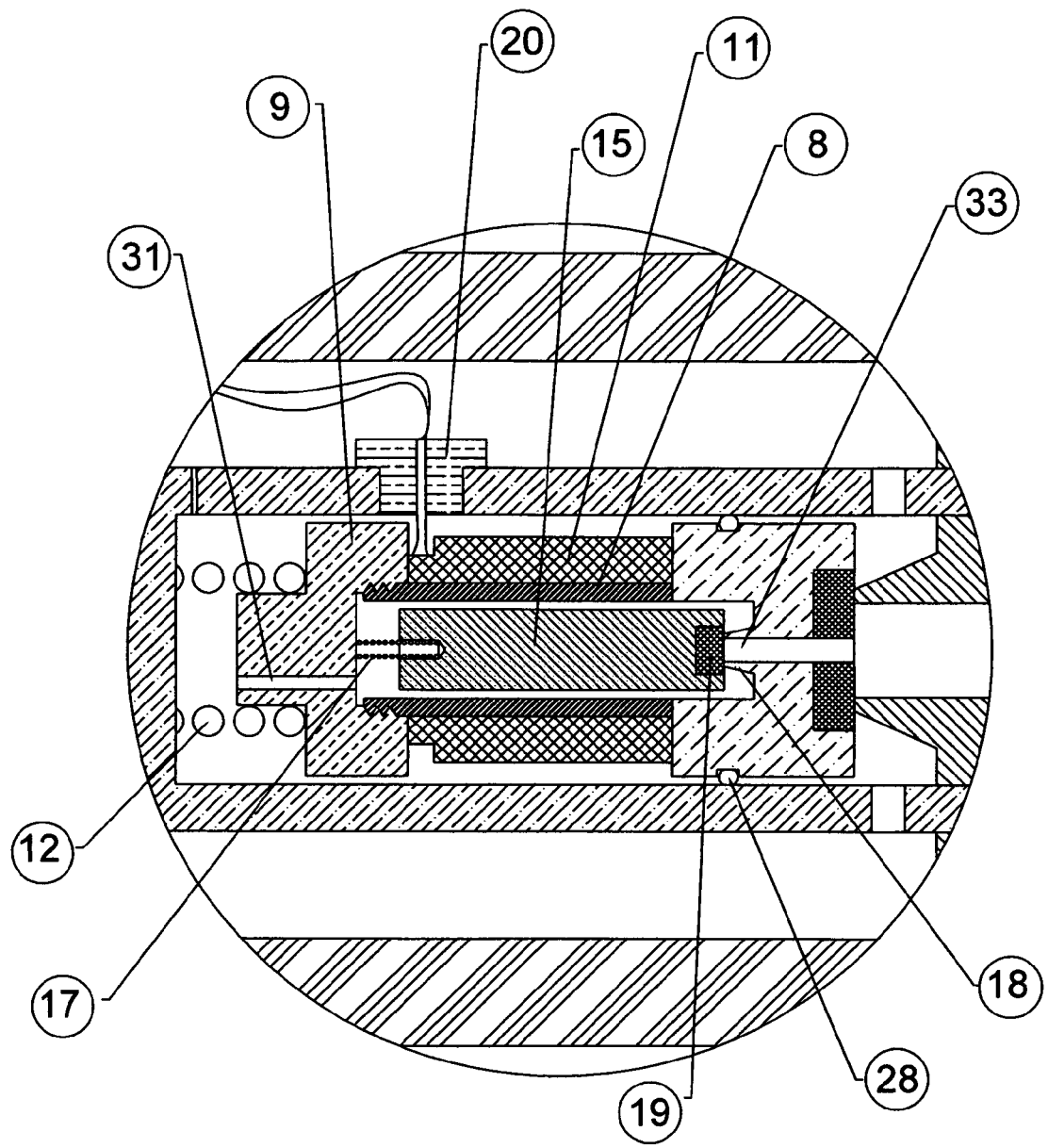
FIG. 2 is a detailed view of FIG. 1 through a valve constructed in accordance with this invention, showing the valve in a "closed" state.

Attention is first directed to FIG. 1 and FIG. 2, which shows an in-tube solenoid gas valve in section view. The valve tube 1 has a hollow hole with internal threads at both ends, to accept both inlet fitting 2 and outlet fitting 3. Both fittings have an axial hole 34 with internal threads for connecting adaptive fittings of piping system. A support cylindrical body 4, pushed by a compression spring 5 against said outlet fitting 3, having a chamber 7, provides the space for movements of the solenoid assembly 6 which comprises of a hollow sleeve 8, a stop 9, a flange 10 and an electrical coil 11.

A compression spring 12 pushes said solenoid assembly 6 to the seal seat 13 of said outlet fitting 3 at "closed" state. A plastic insert 14 is molded onto said flange 10 to provide seal. A magnetic rod 15 moveable axially in the hollow space 16 of said solenoid assembly 6, while a compression spring 17 pushes said magnetic rod 15 against the small seal seat 18 of said flange 10 at "closed" state. A rubber insert 19 is molded onto said magnetic rod 15 to provide seal.

An internal pass-through plug 20, inserting into the support cylindrical body 4, provides the strain relief of lead wires of coil 21 which extends from said electrical coil 11, through said support cylindrical body 4, to the cavity 22 of said valve tube 1. Said lead wires of coil 21 are soldered onto the terminals of an external pass-through connector 23 at the bottom of the said connector 23 as shown in the drawing. The said external pass-through connector 23 is placed in said inlet fitting 2 with an o-ring 24 that seals high pressure gas. Because of the high pressure in said valve tube 1, a metal plug 25 with a center hole is threaded into said inlet fitting 2 to hold said external pass-through connector 23.

The high pressure gas passes through said inlet fitting 2 from upstream piping system to said cavity 22 of said valve tube 1. Gas penetrates into the front inside chamber 26 of said support cylindrical body 4 through a miniscule hole 27 and an o-ring 28 divides said chamber 7 of said support cylindrical body 4 into two chambers, said front inside chamber 26 and said back inside chamber 29. Gas from said valve tube 1 flows through holes 30 locating peripherally into said back inside chamber 29 of said support cylindrical body 4. The gas in said front inside chamber 26 fills said hollow space 16 of said solenoid assembly 6 through the eccentric axial small hole 31.

At "closed" state, as shown in FIG. 2, both said magnetic rod 15 and said solenoid assembly 6 are pushed by said compression spring 17 and said compression spring 12 respectively. Since the seal material is molded onto both said magnetic rod 15 and said flange 10, both the spring force and the high pressure gas push the seal against to said small seal seat 18 and seal seat 13, therefore blocks the gas to flow to the outlet passage.

Figure 3:
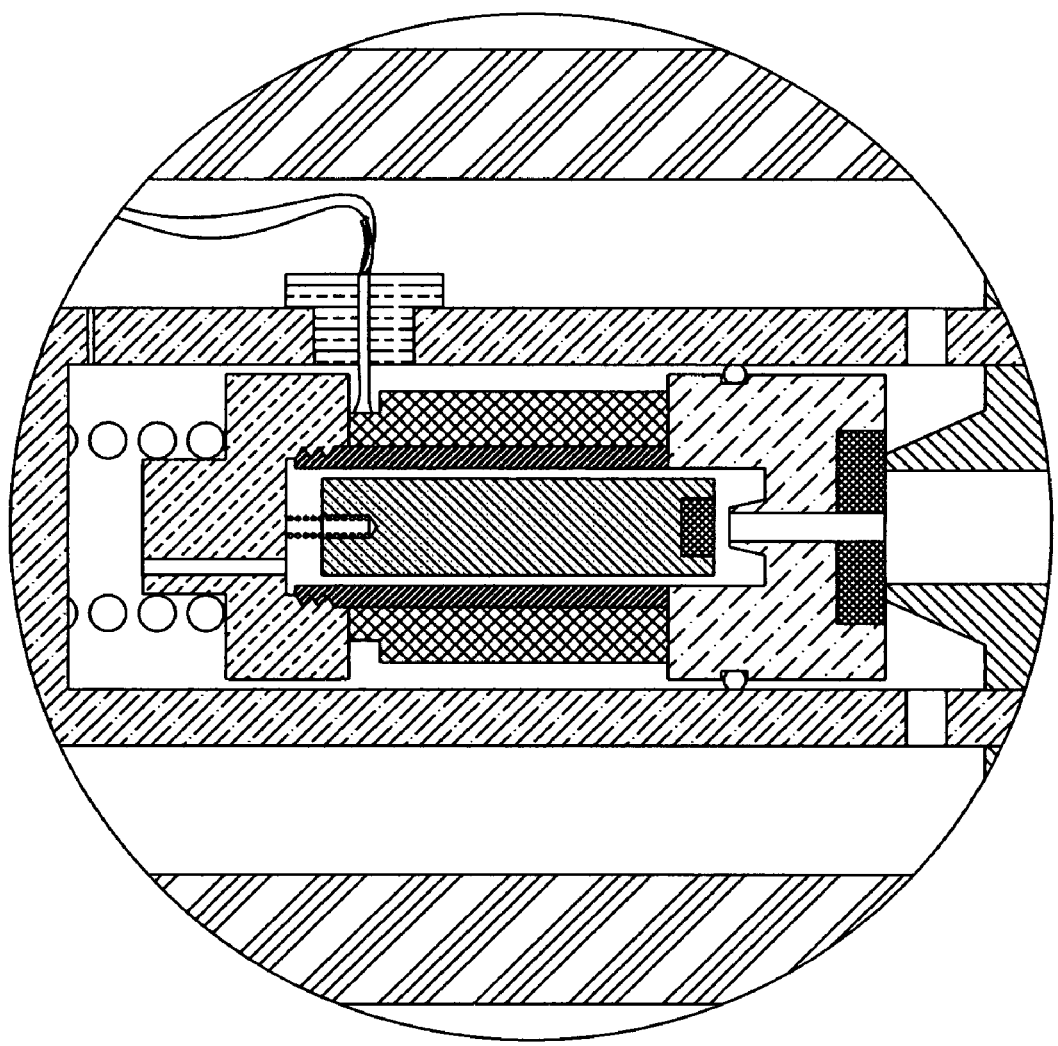
FIG. 3 is a detailed view, similar to that of FIG. 2, showing the small piston opens the bleed orifice with an active magnetic field.

Wires from power supply 32, through said thread metal plug 25, are soldered onto the terminals of said external pass-through connector 23 at the outer of said valve tube 1, providing the channel for input electrical current to said electrical coil 11 which is incorporated with said solenoid assembly 6 to provide a magnetic field for movements of said magnetic rod 15 and said solenoid assembly 6 of the valve. The appropriate materials should be selected for stop 9, sleeve 8, support cylindrical body 4, and flange 10 so that these components form a magnetic loop. At the first stage of opening, the solenoid is energized, as shown in FIG. 3, said magnetic rod 15 is pulled up by the magnetic force to allow the gas flow in said hollow space 16 flow through bleed orifice 33 and axial hole 35 in said flange 10. Because the diameter of said minuscule hole 27 is smaller than that of said bleed orifice 33, so that, the amount of gas supply into said hollow space 16 is less than that of gas released; the pressure difference between the front and back side of magnetic rod 15 is equal. The magnetic force created by said electrical coil 11 causes said magnetic rod 15 to slide and remains in "open state".

Figure 4:
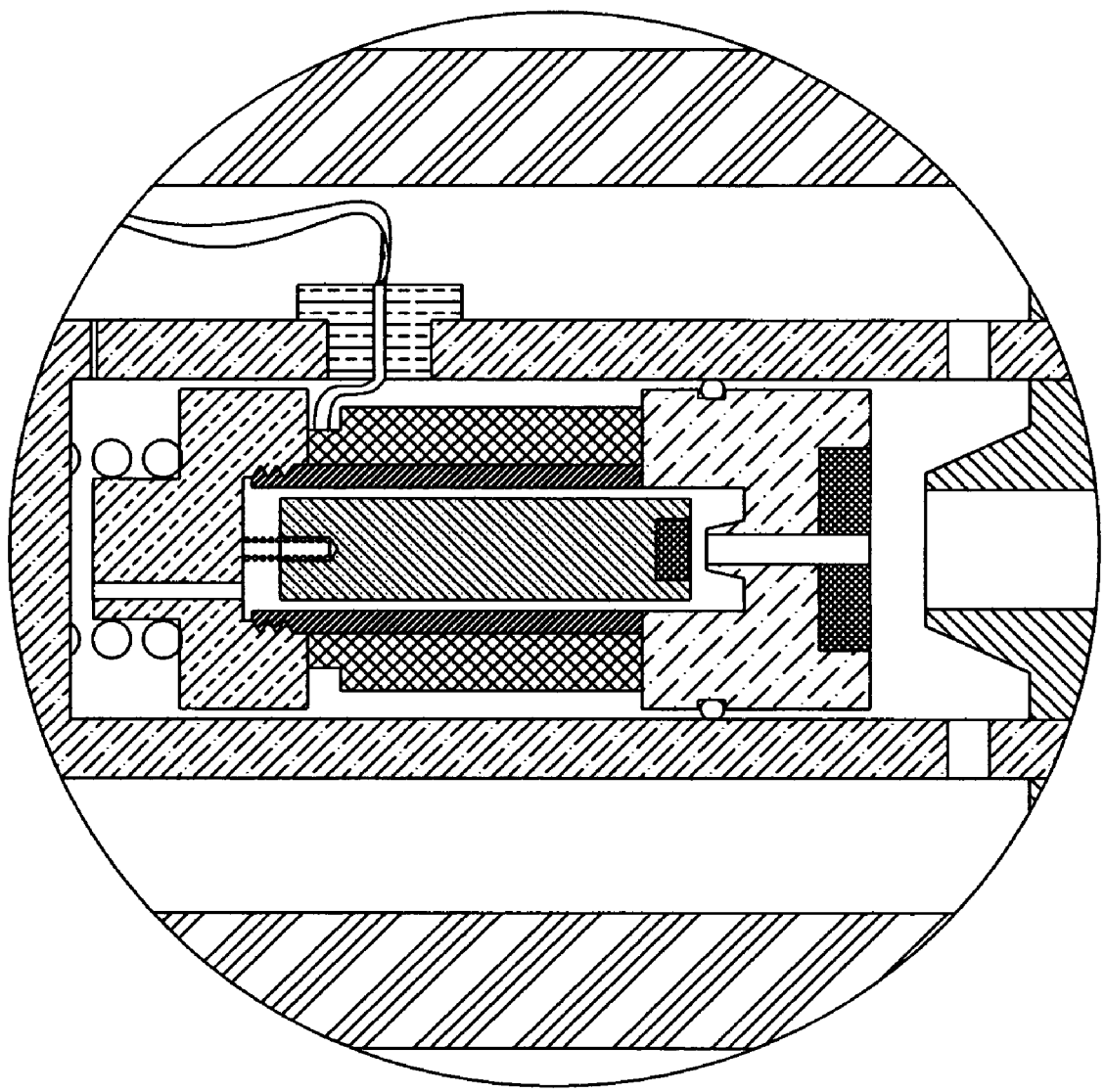
FIG. 4 is a detailed view, similar to that of FIG. 2, showing the main piston opens the outlet passage with an active magnetic field. The valve is in a "fully open" state.

Since the diameter of said miniscule hole 27 is much smaller than that of said through hole 30 and said o-ring 28 segregates said chamber 7 into said front inside chamber 26 and said back inside chamber 29, the gas pressure in said front chamber 26 is less than that of said back inside chamber 29, causes a pressure difference between front and back sides of said solenoid assembly 6. Said solenoid assembly 6 moves, as shown in FIG. 4, allowing flow through said outlet fitting 3.

Figure 5:
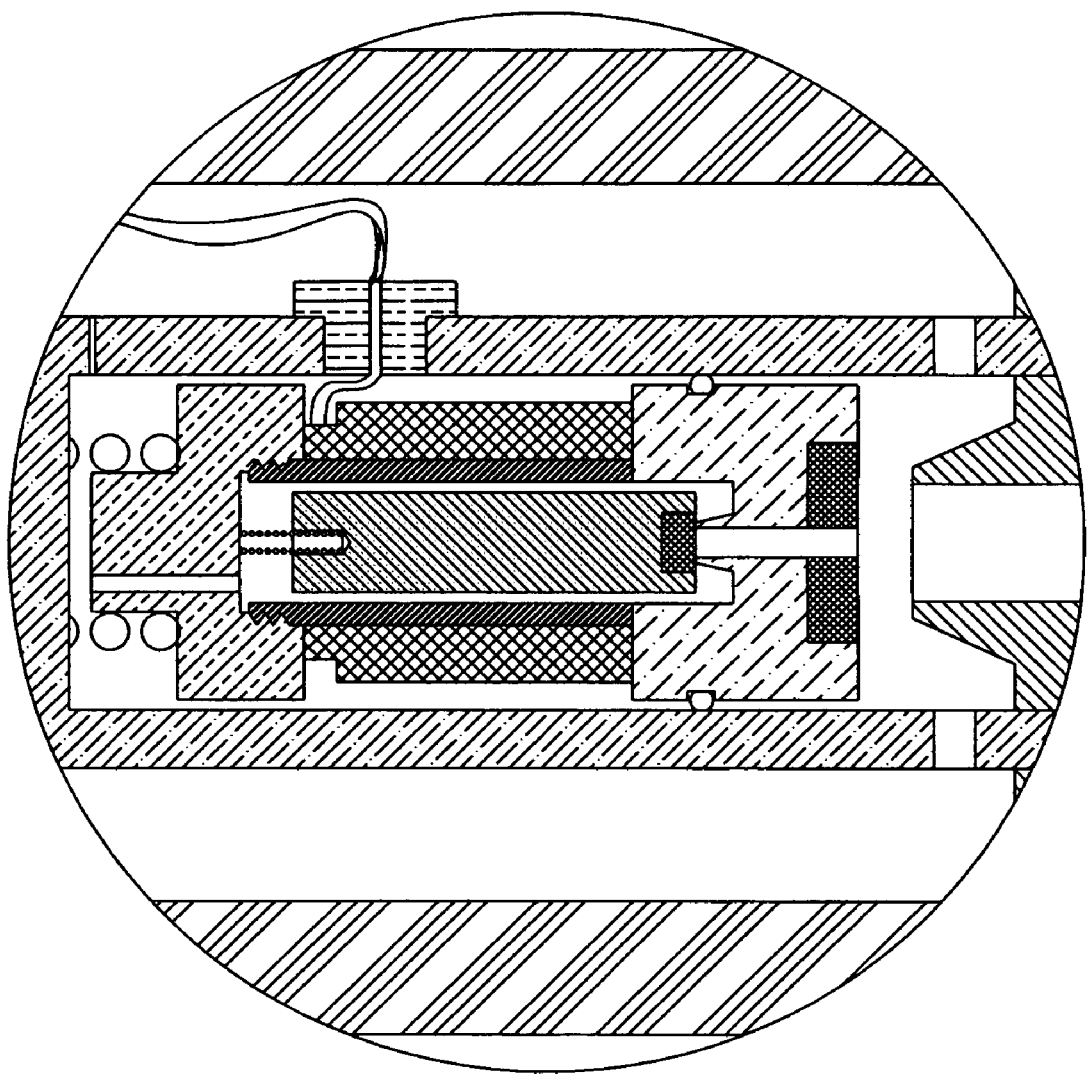
FIG. 5 is a detailed view, similar to that of FIG. 2, showing the small piston closes the bleed orifice after the magnetic field diminishes.

When said electrical coil 11 is de-energized, as shown in FIG. 5, said magnetic rod 15 moves against the small seal seat 18 pushed by the compression spring 17. While high pressure gas enters the hollow space 16 through a minuscule hole 27 and a eccentric axial small hole 31, builds up the gas pressure in said hollow space 16 of said solenoid assembly 6. The pressure in said hollow space 16 compresses the rubber insert 19 onto the magnetic rod 15 to close the bleed orifice 33.

The increasing gas pressure in said front inside chamber 26 causes pressure equalization, results in said compression spring 12 pushes said solenoid assembly 6 against the seal seat 13. This causes the amount of gas leak to the outlet passage to be less than that of flows into the chamber 7 of the support cylindrical body 4. Because of the difference in projected surface area between front and back side of said solenoid assembly 6, the force of the front side chamber 26 is larger than that of the back side chamber 29. Hence, the plastic insert 14 of said flange 10 is compressed onto the seal seat 13 to cease the gas flow. This is the "closed" state, as shown in FIG. 1.

We claim:

1. An in-tube solenoid gas valve, comprising:
   a valve tube defining a gas inlet passage, a gas outlet passage and a cavity; an inlet fitting with an axial hole threading into said inlet passage of said valve tube to connect to the in-line tube of piping system;
   an outlet fitting provides a seal seat and an axial hole threading into said outlet passage of said valve tube to connect to the inline tube of piping system;
   a support cylindrical body with a chamber is pushed by a compression spring, against said inlet fitting, inserting into said outlet fitting;
   a solenoid assembly comprising a flange, an electrical coil, a stop, and a sleeve, able to slide in said chamber of said support cylindrical body;
   said solenoid assembly comprising an O-ring located in said flange for segregating said chamber to a front side chamber and a back side chamber;
   said flange provides a small seal seat, a bleed orifice, and an axial hole;
   a plastic insert with a center hole, is molded onto said flange, to provide seal.

2. The in-tube solenoid gas valve as defined in claim 1; a minuscule hole on said support cylindrical body acts a restricting gas conduit, limiting the amount of gas of cavity flow into said front side chamber of said support cylindrical body.

3. The in-tube solenoid gas valve as defined in claim 1; having a gas conduit for passing the gas from said front side chamber of said support cylindrical body to a hollow space of said solenoid assembly, via an eccentric axial small hole on said stop.

4. The in-tube solenoid gas valve as defined in claim 1; having a gas conduit for passing the gas from said hollow space of said solenoid assembly, via said axial hole of said flange; said minuscule hole having a diameter smaller than that of both said eccentric axial small hole and said bleed orifice of said flange of said solenoid assembly.

5. An in-tube solenoid gas valve as defined in claim 1; holes, on said support cylindrical body peripherally, locating at the side of inserting into said outlet fitting, provide gas conduits for passing the gas in said cavity flow into said back side chamber.

6. An in-tube solenoid gas valve as defined in claim 1; said solenoid assembly being spring biased by a compression spring onto said seal seat of said outlet fitting, to a closed position.

7. An in-tube solenoid gas valve as defined in claim 1; a magnetic rod, able to slide inside said sleeve in said hollow space of said solenoid assembly, is biased by a compression spring and pushed onto said small seal seat of said flange to a closed position; a rubber insert with an axial hole, is molded onto said magnetic rod, to provide seal.

8. An in-tube solenoid gas valve as defined in claim 1; said electrical coil associated with said stop, said sleeve, said flange of said solenoid assembly and said support cylindrical body, provides a magnetic field for movements of said magnetic rod and said flange incorporating within said solenoid assembly, so that when the electrical current in said electrical coil is diminished, said magnetic rod closes said bleed orifice of said flange and causes a pressure equalization, allowing said compression spring to push said solenoid assembly to close the valve and when said electrical coil means is energized, said magnetic rod opens said bleed orifice to release the gas in said hollow space of said solenoid assembly and lowers the pressure in said front side chamber which causes pushing of said solenoid assembly to open the valve.

9. An in-tube solenoid gas valve as defined in claim 1; extend lead wires of said electrical coil pass through the hole of an internal pass-through plug which is inserted into said support cylindrical body, to said cavity of said valve tube.

10. An in-tube solenoid gas valve as defined in claim 1; said extend lead wires of said electrical coil as defined in claim 9, is soldered on terminals of an external pass-through connector at one end; external wires which is from a power supply, through a threaded metal plug with a center hole, is soldered on terminals of said external pass-through connector at the other end; electrical current pass through said external wires from said power supply, said external pass-through connector, to said lead wires of said electrical coil, to provide a said magnetic field for movements of said magnetic rod and said solenoid assembly.

11. An in-tube solenoid gas valve, defined in claim 1; said external pass-through connector comprising an o-ring for sealing internal pressure gas in said cavity of said valve tube; said thread metal plug thread into said inlet fitting, to hold said external pass-through connector in said inlet fitting.

\* \* \* \* \*